United States Patent
Winterhalter et al.

(10) Patent No.: US 9,004,587 B2
(45) Date of Patent: Apr. 14, 2015

(54) CANOPY ASSEMBLY FOR USE IN A CHILD CARRIER APPARATUS AND ITS ASSEMBLY METHOD

(75) Inventors: Andrew J. Winterhalter, West Lawn, PA (US); Robert E. Haut, West Chester, PA (US); Curtis M. Hartenstine, Birdsboro, PA (US)

(73) Assignee: Wonderland Nurserygoods Company Limited, Hong Kong (HK)

( * ) Notice: Subject to any disclaimer, the term of this patent is extended or adjusted under 35 U.S.C. 154(b) by 247 days.

(21) Appl. No.: 13/361,583

(22) Filed: Jan. 30, 2012

(65) Prior Publication Data
US 2012/0193950 A1  Aug. 2, 2012

Related U.S. Application Data

(60) Provisional application No. 61/462,368, filed on Feb. 1, 2011, provisional application No. 61/626,444, filed on Sep. 27, 2011.

(51) Int. Cl.
*A47C 7/62* (2006.01)
*B62B 9/14* (2006.01)

(52) U.S. Cl.
CPC ........................... *B62B 9/14* (2013.01)

(58) Field of Classification Search
CPC ........... A47C 29/00; B62B 9/14; B62B 9/142
USPC ................ 297/184.1, 184.13, 184.15, 184.17
See application file for complete search history.

(56) References Cited

U.S. PATENT DOCUMENTS

| | | | | |
|---|---|---|---|---|
| 2,166,832 A | * | 7/1939 | Wenker | 297/184.15 |
| 4,880,331 A | * | 11/1989 | Zun | 403/24 |
| 5,190,390 A | | 3/1993 | Ming-Tai | |
| 5,551,745 A | * | 9/1996 | Huang | 296/111 |
| 5,887,935 A | * | 3/1999 | Sack | 296/122 |
| 6,027,163 A | * | 2/2000 | Longenecker | 297/184.13 |
| 6,170,910 B1 | * | 1/2001 | Bapst | 297/184.13 |
| 6,443,522 B1 | * | 9/2002 | Kain et al. | 297/184.17 |
| 2002/0036417 A1 | | 3/2002 | Kain et al. | |
| 2010/0270832 A1 | * | 10/2010 | Zhang | 297/184.13 |

FOREIGN PATENT DOCUMENTS

| | | |
|---|---|---|
| CN | 201183519 Y | 9/2007 |
| CN | 201597616 U | 10/2010 |
| DE | 19841035 A1 | 11/1999 |
| DE | 19938562 A1 | 1/2001 |
| EP | 0872400 A2 | 10/1998 |
| EP | 1078841 A2 | 2/2001 |
| GB | 2444427 A | 6/2008 |
| JP | 092283 A | 1/1997 |

* cited by examiner

*Primary Examiner* — Philip Gabler
(74) *Attorney, Agent, or Firm* — David I. Roche; Baker & McKenzie LLP

(57) ABSTRACT

A canopy assembly can include a support bow having a side end portion, and a mount fixture including two coupling parts pivotally connected together, one of the two coupling parts being adapted to securely affix with the side end portion, and the other one of the two coupling parts being configured to affix with a support frame of a child carrier apparatus. Each of the two coupling parts can include a retaining structure integrally formed therewith, the retaining structures being engaged with each other to hold the two coupling parts together while allowing relative rotation between the two coupling parts.

19 Claims, 15 Drawing Sheets

CANOPY ASSEMBLY FOR USE IN A CHILD CARRIER APPARATUS AND ITS ASSEMBLY METHOD

CROSS-REFERENCE TO RELATED APPLICATION(S)

This application claims priority to U.S. Provisional Patent Application No. 61/462,368 filed on Feb. 1, 2011, and to U.S. Provisional Patent Application No. 61/626,444 filed on Sep. 27, 2011.

BACKGROUND

1. Field of the Invention

The present invention relates to child carrier apparatuses provided with canopy assemblies.

2. Description of the Related Art

Most child stroller apparatuses have canopies that can cover the child's seating area. Canopies can protect the child from the rain and direct sunlight. Moreover, it is desirable to provide a mechanism that allows to adjust the extension of the canopy for facilitating its use. However, the adjustment mechanism usually requires a structure involving the assembly of multiple parts, and in particular, shafts for achieving pivotal connections and fastening elements.

Therefore, there is a need for a canopy assembly that can reduce the amount of component parts and address at least the foregoing issues.

SUMMARY

The present application describes a canopy assembly for use in child carrier apparatuses, and its assembly method. In one embodiment, the canopy assembly includes a support bow having a side end portion, and a mount fixture including two coupling parts pivotally connected together, one of the two coupling parts being adapted to securely affix with the side end portion, and the other one of the two coupling parts being configured to affix with a support frame of a child carrier apparatus, wherein each of the two coupling parts includes a retaining structure integrally formed therewith, the retaining structures being engaged with each other to hold the two coupling parts together while allowing relative rotation between the two coupling parts.

In other embodiments, a method of assembling a canopy is described. The method includes providing a mount fixture including two coupling parts, one of the two coupling parts being adapted to securely affix with a side end portion of a canopy support bow, and the other one of the two coupling parts being configured to affix with a support frame of a child carrier apparatus, wherein each of the two coupling parts includes a retainer structure integrally formed therewith, and engaging the retainer structures with each other to hold the two coupling parts together while allowing relative rotation between the two coupling parts.

In some other embodiments, the present application describes a child carrier apparatus comprising a support frame, and a canopy assembly. The canopy assembly includes a support bow having two end portions, a cover material held with the support bow, and two mount fixtures for assembling the two end portions with the support frame. Each of the mount fixtures includes first and second coupling parts movably held together, the first coupling part being affixed with one end portion, and the second coupling part being affixed with the support frame, wherein each of the two end portions of the support bow continuously applies a spring force that urges the first coupling part toward the second coupling part of the associated mount fixture.

The foregoing is a summary and shall not be construed to limit the scope of the claims. The operations and structures disclosed herein may be implemented in a number of ways, and such changes and modifications may be made without departing from this invention and its broader aspects. Other aspects, inventive features, and advantages of the invention, as defined solely by the claims, are described in the non-limiting detailed description set forth below.

DETAILED DESCRIPTION OF THE EMBODIMENTS

The present application describes a canopy assembly that is convenient to install and operate and requires a smaller amount of component parts, which can reduce the manufacture cost and facilitate assembly. The canopy assembly can include a support bow having a side end portion, and a mount fixture including two coupling parts pivotally connected together, one of the two coupling parts being adapted to securely affix with the side end portion, and the other one of the two coupling parts being configured to affix with a support frame of a child carrier apparatus. Each of the two coupling parts can include a retaining structure integrally formed therewith, the retaining structures being engaged with each other to hold the two coupling parts together while allowing relative rotation between the two coupling parts. While embodiments of the canopy assembly are described herein as being exemplary installed on a stroller apparatus, the canopy assembly can also be adapted for use with any child carrier apparatuses including, without limitation, stroller apparatuses, play yard, baby cribs, and the like.

Figure 1:
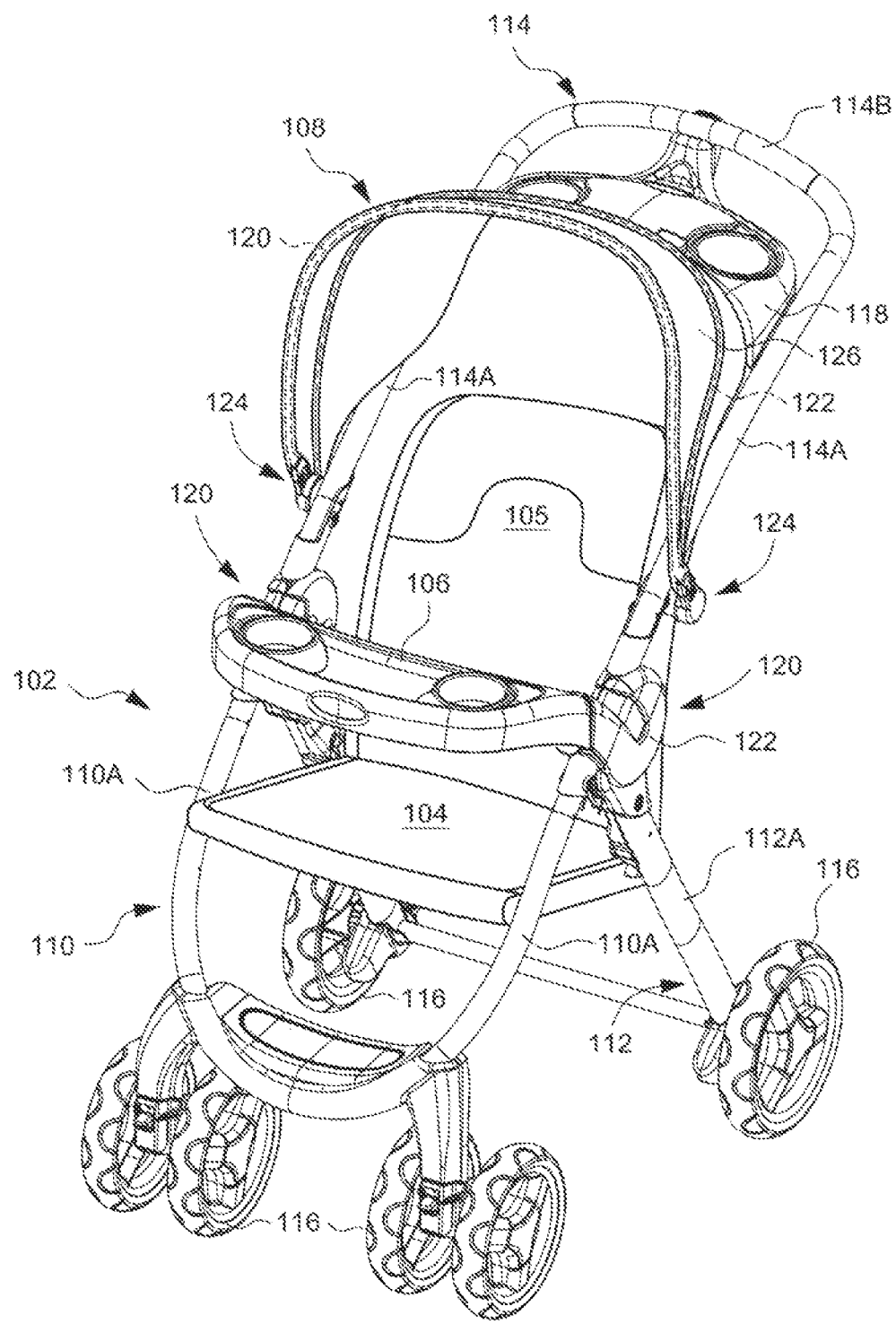
FIG. 1 is a schematic view illustrating an embodiment of a stroller apparatus.

FIG. 1 is a schematic view illustrating a stroller embodiment of a child carrier apparatus 100. The child carrier apparatus 100 can include a support frame 102, a seat 104, a backrest 105, a front guard 106 and a canopy assembly 108. The support frame 102 can include a front leg frame 110, a rear leg frame 112 and a handle 114. Each of the front and rear leg frames 110 and 112 can be respectively formed from the assembly of one or more tubular segments, and have lower ends respectively mounted with a plurality of wheels 116. Moreover, each of the front and rear leg frames 110 and 112 can have symmetrical left and right side segments (respectively designated as 110A for the side segments of the front leg frame 110, and 112A for the side segments of the rear leg frame 112) respectively connected with the handle 114.

The handle 114 can be formed from the assembly of one or more tubular segments, and has a generally U-shape comprised of symmetrical left and right side segments 114A (only one side segment 114A is shown in FIG. 1) and a transverse segment 114B connected between the side segments 114A. A tray 118 may be connected between the side segments 114A of the handle 114 at an elevated position for the adult's use.

The side segments 110A of the front leg frame 110 and the side segments 112A of the rear leg frame 112 can have upper end portions respectively assembled with lower end portions of the corresponding side segments 114A of the handle 114 via joint structures 120. The joint structures 120 can pivotally assemble the first and second leg frames 110 and 112 and the handle 114, so that they can rotate relative to one another to collapse or deploy the support frame 102.

Referring again to FIG. 1, the canopy assembly 108 can have left and right sides symmetrically coupled with the side segments 114A of the handle 114. In one embodiment, the canopy assembly 108 can include first and second support bows 120 and 122 of curved shapes (shown with dashed lines), two mount fixtures 124 through which left and right ends of the first support bow 120 can respectively assemble with the left and right side segments 114A of the handle 114, and a cover material 126 connected with the first and second support bows 120 and 122. In one embodiment, the cover material 126 can be made of a flexible material, such as a fabric, plastic sheet, and the like. The cover material 126 may include sheath layers in which the first and second support bows 120 and 122 can be retained and held.

Figure 2:
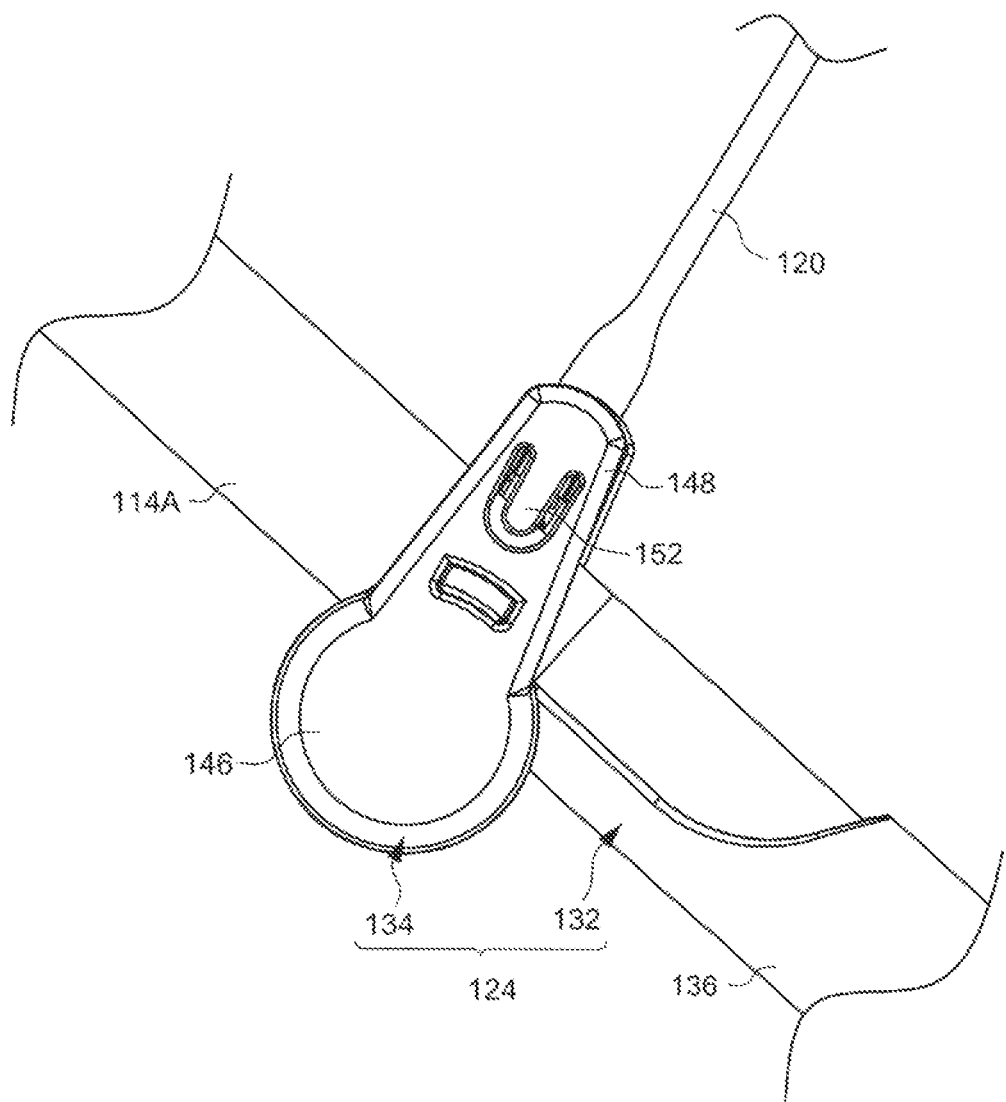
FIG. 2 is an enlarged view illustrating the construction of one mount fixture used in a canopy assembly.
Figure 3:
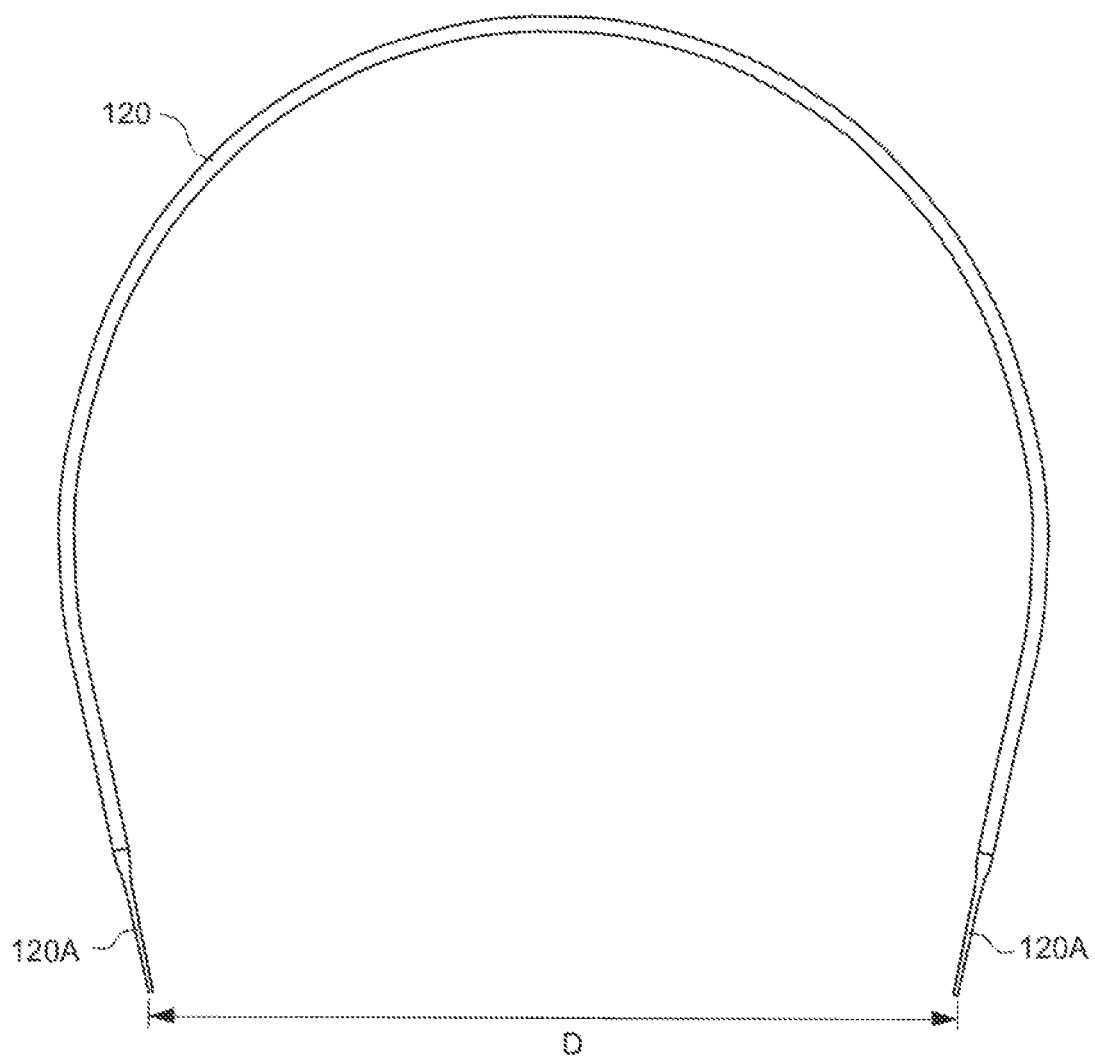
FIG. 3 is a schematic view illustrating one embodiment of an adjustable support bow used in the canopy assembly.

FIG. 2 is an enlarged view illustrating the construction of one mount fixture 124, and FIG. 3 is a schematic view illustrating one embodiment of the first support bow 120. Each of the support bows 120 and 122 can have a generally U-shape, the first support bow 120 being placed in front of the second support bow 122. In one embodiment, the first support bow 120 can be integrally made of a resilient material. Examples of materials used for the first support bow 120 can include steel, metallic alloys, plastics, etc. The second support bow 122 can be made of a same material as the first support bow 120, or from a different material. In one embodiment, the second support bow 122 can be held with the cover material 126 for facilitating stretching of the cover material 126, without connecting with the mount fixture 124. In alternate embodiment, the second support bow 122 can be affixed with a fixed part of the mount fixture 124.

The mount fixture 124 provided at each of the left and right ends of the support bow 120 can include two coupling parts 132 and 134 pivotally connected together. The coupling part 134 can be constructed to pivotally assemble the first support bow 120 with the coupling part 132 without the need of additional parts.

Figure 4:
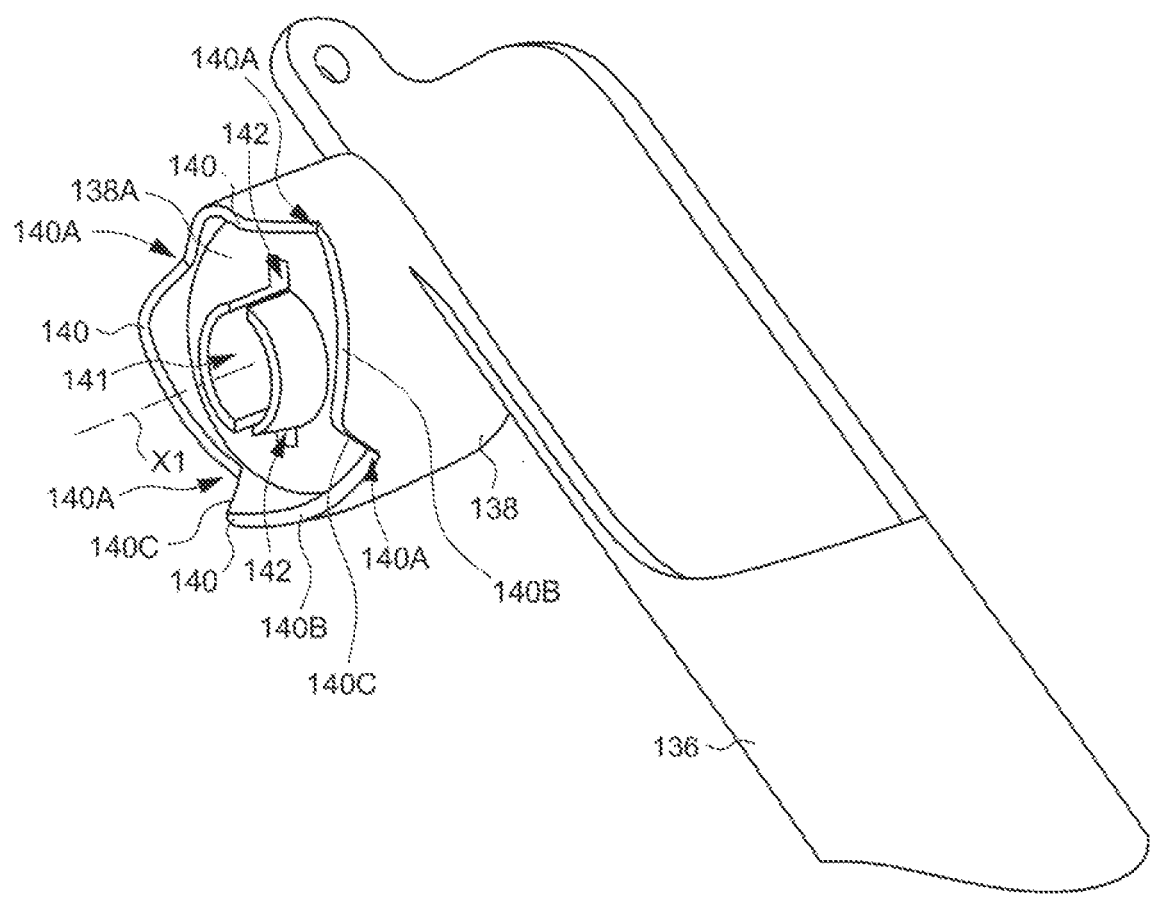
FIG. 4 is a schematic view illustrating one embodiment of a coupling part used in the mount fixture shown in FIG. 2.
Figure 5:
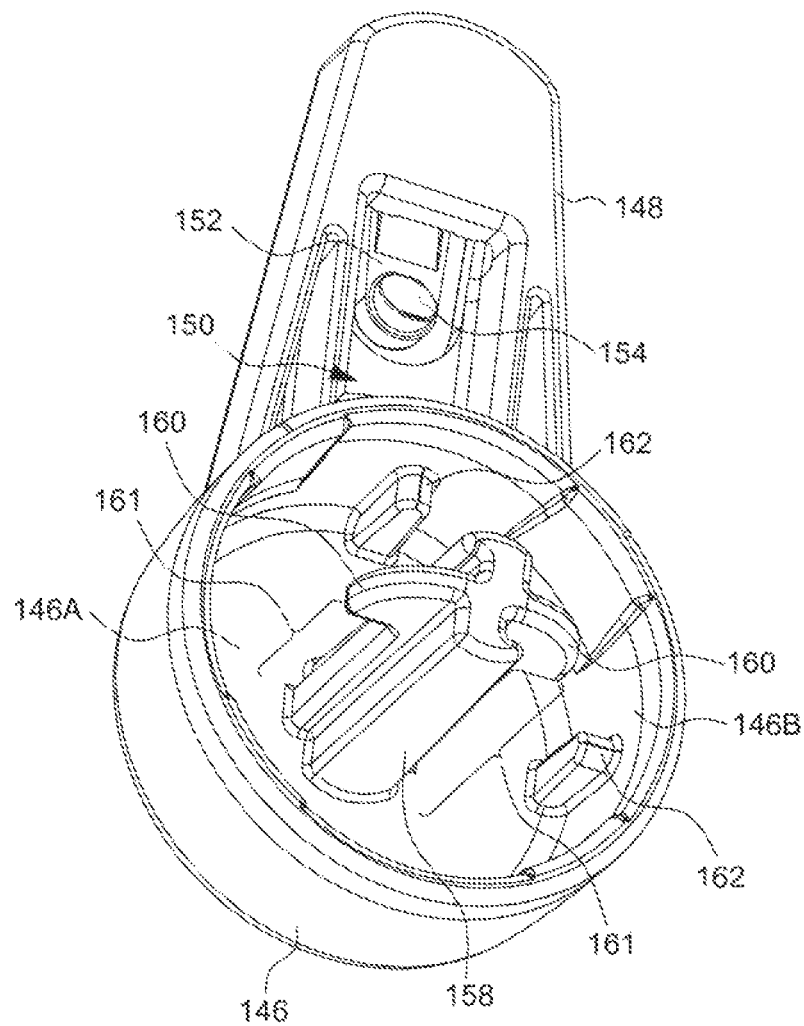
FIG. 5 is a perspective view illustrating the construction of another coupling part used in the mount fixture shown in FIG. 2.
Figure 6:
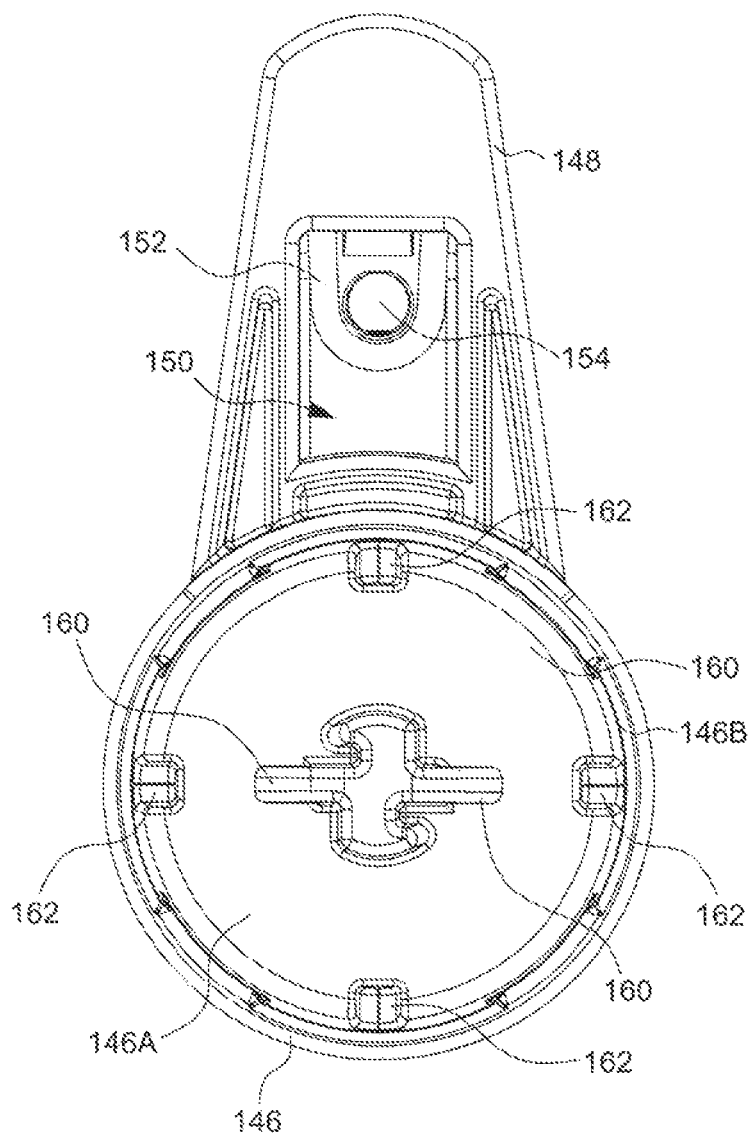
FIG. 6 is a planar view of the coupling part shown in FIG. 5.

FIG. 4 is a schematic view illustrating one embodiment of the coupling part 132. The coupling part 132 can include a sleeve portion 136 and a socket 138. In one embodiment, the coupling part 132, including the sleeve portion 136 and the socket 138, can be formed as an integral body by plastic molding. The sleeve portion 136 can wrap at least partially around one side segment 114A of the handle 114 to affix the mount fixture 124 with the handle 114. In some possible embodiments, the sleeve portion 136 may also have an attachment structure where the second support bow 122 can be affixed.

The socket 138 can be provided at an outside of the handle 114. The socket 138 can be connected with the sleeve portion 136 at a position offset from a lengthwise axis of the sleeve portion 136. The socket 138 can include a plurality of teeth 140 that are disposed along a circular periphery of the socket 138 and surround a base surface 138A of the socket 138, and a plurality of recesses 140A defined between successive teeth 140. Each of the teeth 140 can have a generally triangular shape that projects in a direction substantially parallel to a pivot axis X1 about which the coupling parts 132 and 134 can pivotally assemble with each other. Each of the teeth 140 can have two side slopes 140B and 140C that respectively lower toward the adjacent recesses 140A. In one embodiment, the side slope 140B can have a progressive and longer slant, and the other side slope 140C can be formed as a steeper and shorter slope.

The base surface 138A can include an opening 141 of a circular shape, and two radial key slits 142 extending outward from the rim of the opening 141 at diametrically opposite positions. The opening 141 and the slits 142 can respectively communicate with an inner cavity 144 (better shown in FIG. 7) that is defined in the socket 138 at a side opposite to the base surface 138A. The construction of the socket 138, including the opening 141, the slits 142 and the inner cavity 144, can form a retaining structure of the coupling part 132 that can engage with an associated retaining structure provided on the coupling part 134 for holding the two coupling parts 132 and 134 together while allowing relative rotation there between.

In conjunction with FIGS. 2 and 3, FIGS. 5 and 6 are respectively perspective and planar views illustrating a construction of the coupling part 134. The coupling part 134 can include a cap 146 of a generally round shape, and a connecting portion 148 joined with the cap 146. In one embodiment, the coupling part 134, including the cap 146 and the connecting portion 148, can be formed in an integral body by plastic molding. The connecting portion 148 can be securely affixed with an end portion of the first support bow 120. For example, the connecting portion 148 can include a slit 150 through which a flat end portion 120A of the first support bow 120 can be inserted, and a resilient tab 152 having a protrusion 154 that can engage through the end portion 120A to securely hold the end portion 120A of the first support bow 120.

The cap 146 can have a generally cylindrical shape, and include a base surface 146A of a disk shape, and a lateral sidewall 146B surrounding the base surface 146A. The base surface 146A can centrally include a raised portion 158, and one or more retainer extension 160 connected with a distal end of the raised portion 158. The raised portion 158 and the retainer extension 160 can be formed integrally with the cap 146 by plastic molding. In one embodiment, the raised portion 158 can have an elongated shape, but other shapes may also be adequate. The raised portion 158 can be inserted through the opening 141, and can have a side surface adjacent to or in sliding contact with the inner sidewall of the opening 141.

In the illustrated embodiment, two retainer extensions 160 are provided, which can project in opposite radial directions from the raised portion 158, and can be offset from the base surface 146A such that gaps 161 are respectively delimited between the retainer extensions 160 and the base surface 146A. The distance separating the two outmost ends of the two retainer extensions 160 is substantially equal to the distance separating the two outmost ends of the two slits 142 formed in the socket 138. The construction of the cap 146, including the raised portion 158 and the retainer extensions 160, can form a retaining structure of the coupling part 134 adapted to engage with the associated retaining structure of the coupling part 132 described previously.

For preventing abrasion induced by the contact between the coupling parts 132 and 134, it is worth noting that different materials can be used to fabricate the coupling part 132 (in particular the socket 138) and the coupling part 134 (in particular the cap 146). For example, polypropylene plastics or acetal plastics may be used for the coupling part 132, whereas acetal plastics or nylon may be used for the coupling part 134.

Referring again to FIGS. 5 and 6, the lateral sidewall 146B of the cap 146 can also include one or more ribs 162 disposed around the raised portion 158. In one embodiment, the number of ribs 162 can be the same as that of the recesses 140A defined between the teeth 140, e.g., four ribs 162.

Figure 7:
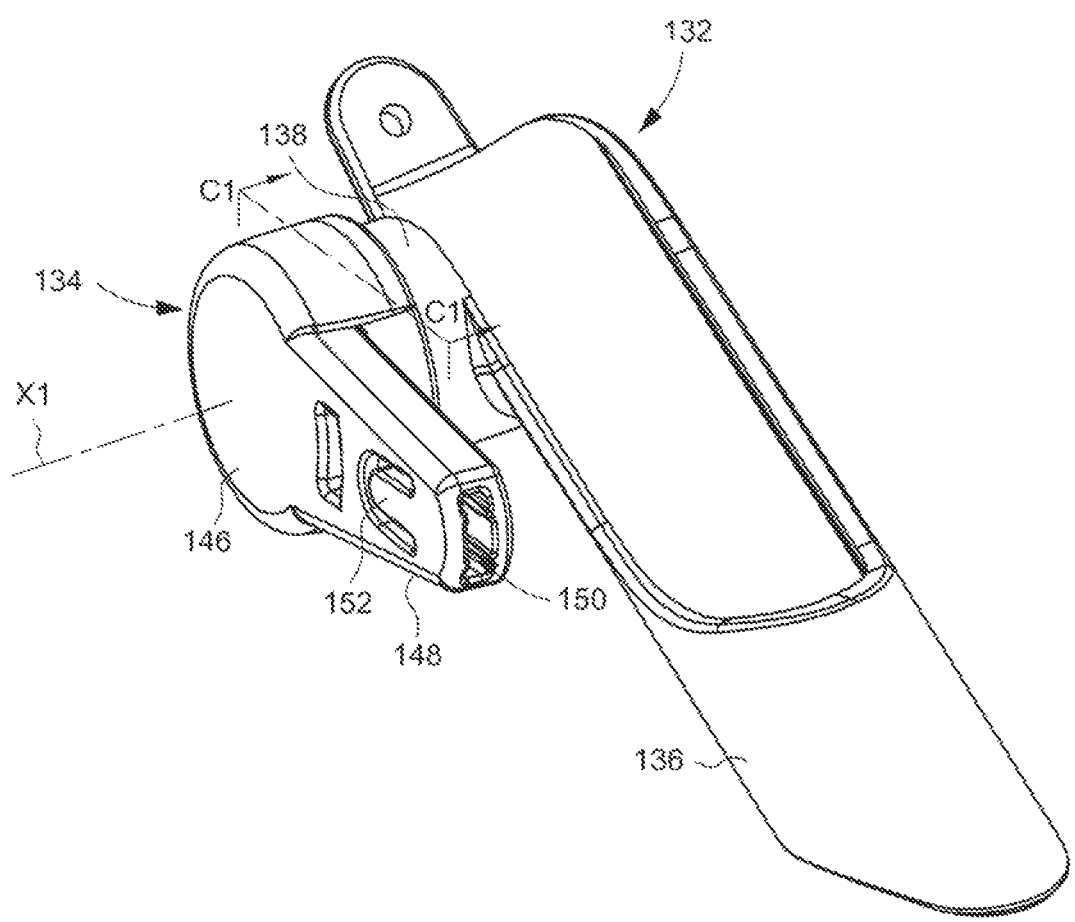
FIG. 7 is a perspective view illustrating an initial stage in the assembly of the mount fixture.
Figure 8:
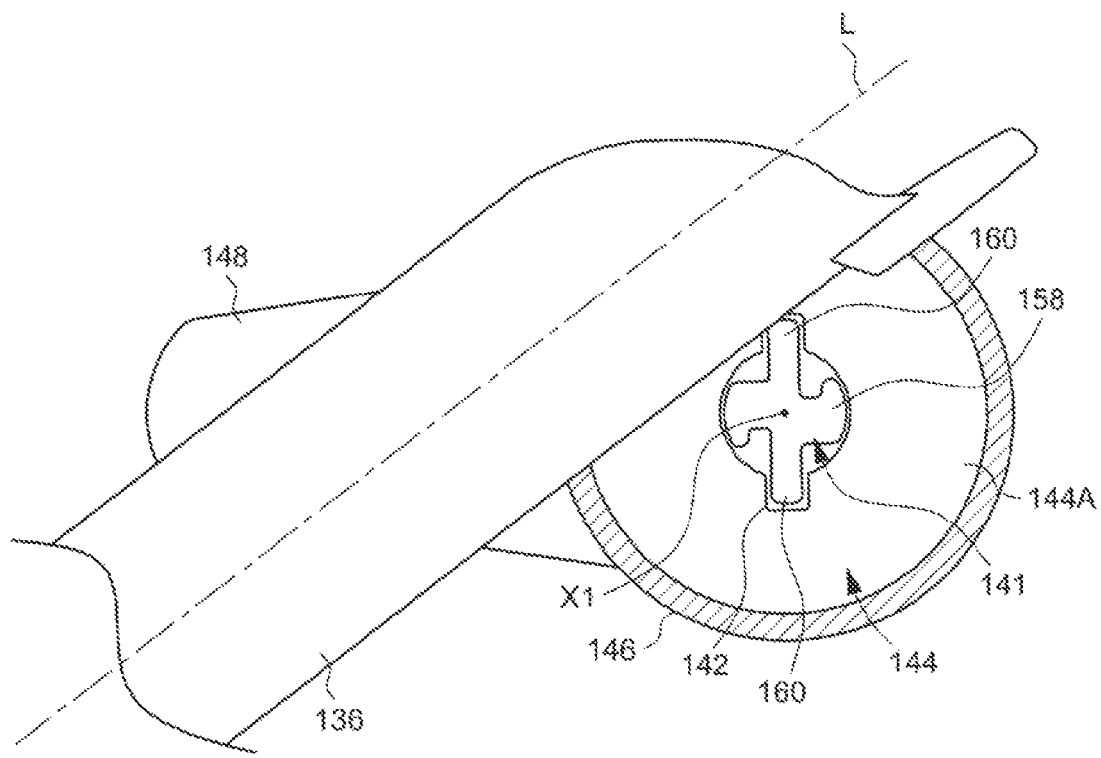
FIG. 8 is a partial cross-sectional view taken along section C1 shown in FIG. 7.

Exemplary assembly of the coupling parts 132 and 134 is described hereafter with reference to FIGS. 7-10. FIG. 7 is a perspective view illustrating an initial stage in the assembly operation, and FIG. 8 is a partial cross-sectional view taken along section C1 shown in FIG. 7. Referring to FIGS. 4, 5, 7 and 8, the cap 146 can be pushed onto the socket 138 with the raised portion 158 and the retainer extensions 160 respectively inserted through the opening 141 and the slits 142, until the retainer extensions 160 are fully received in the inner cavity 144. During this initial placement, the connecting portion 148 can be located at an angular position relatively close to a lengthwise axis L of the sleeve portion 136 (which also corresponds to the lengthwise axis of the side segment 114A of the handle 114). Moreover, the lateral sidewall 146B of the cap 146 can be adjacent to an outer side of the teeth 140, and the side surface of the raised portion 158 can be in sliding contact with the inner sidewall of the opening 141 so as to guide pivotal movements of the coupling part 134 relative to the coupling part 132 about the pivot axis X1.

Figure 9:
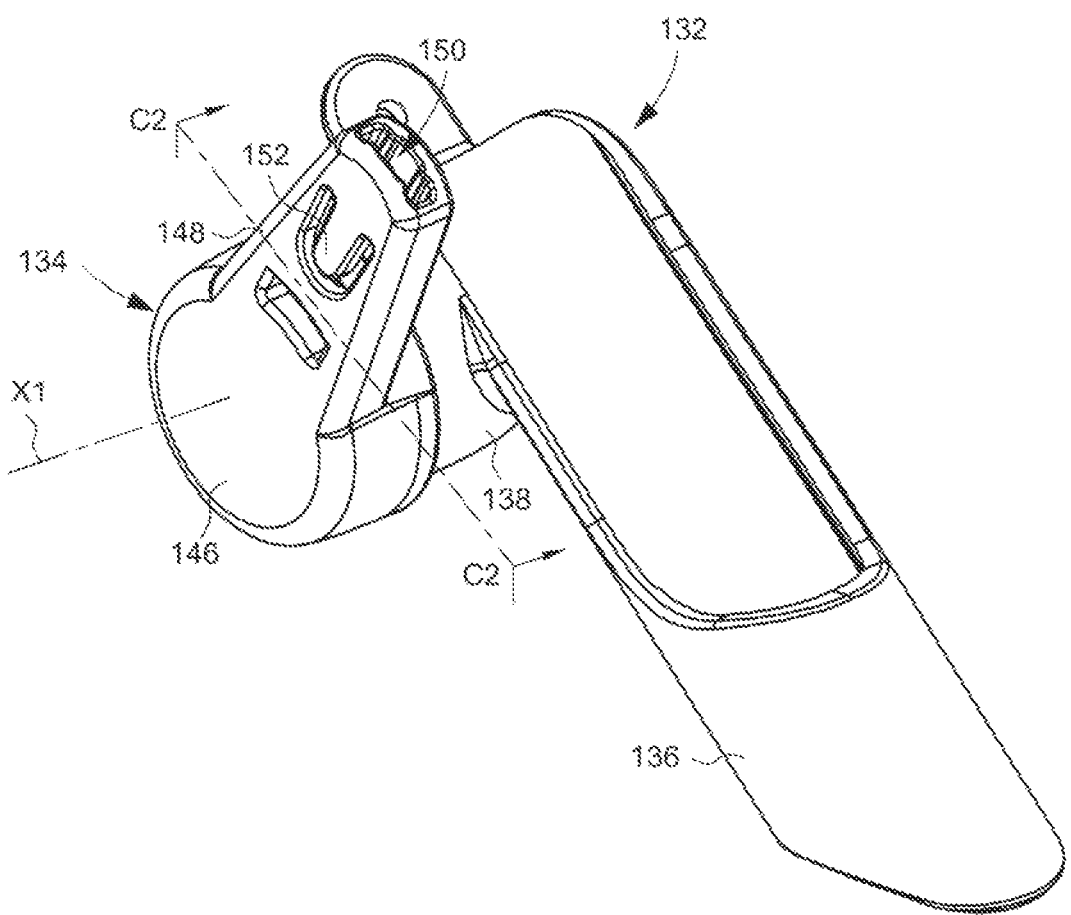
FIG. 9 is a perspective view illustrating a locking step in the assembly of the mount fixture.
Figure 10:
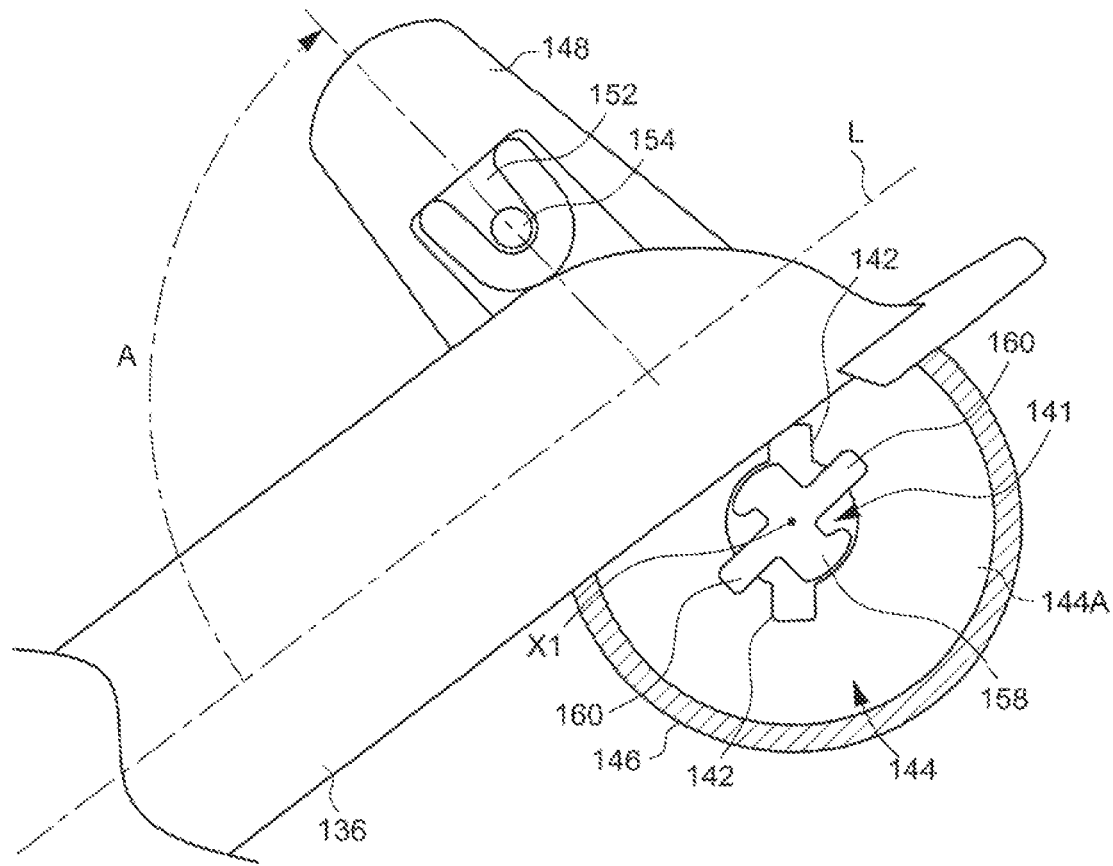
FIG. 10 is a partial cross-sectional view taken along section C2 shown in FIG. 9.

FIG. 9 is a perspective view illustrating a locking step, and FIG. 10 is a partial cross-sectional view taken along section C2 shown in FIG. 9. Once the cap 146 has been placed in proper alignment as shown in FIGS. 7 and 8, the coupling part 134 can be rotated in a direction that increases the angle A defined between the lengthwise axis L and the connecting portion 148 (e.g., clockwise direction in the schematic view of FIG. 10). As a result, the retainer extensions 160, which generally project along a plane that is perpendicular to the pivot axis X1, are misaligned from the positions of the slits 142 and become blocked in the socket 138. Owing to the interference between the retainer extensions 160 and a base wall 144A of the inner cavity 144 (which is opposite to the surface 138A of the socket 138), the raised portion 158 can be kept assembled through the opening 141 of the socket 138. In this manner, the pivotal connection between the first support bow 120 and the mount fixture 132 can be securely held without the need of fastener members such as rivets or bolt-nut assemblies.

Referring again to FIGS. 1-3, once the canopy assembly 108 is completely installed on the support frame 102, the side end portions 120A of the first support bow 120 can lie outside a gap between the side segments 114A of the handle 114. A maximum extension of the first support bow 120 relative to the second support bow 122 can be limited by adequate limiting structures, e.g., by the size of the cover material 126. On the other hand, a folded configuration of the canopy assembly 108 can rest against another limiting structure, e.g., the tray 118 of support frame 102. During adjustment of the first support bow 120, the cap 146 can never reach the position where the retainer extensions 160 are aligned with the slits 142. Accidental disassembly of the cap 146 from the socket 138 thus can be prevented.

After the cover material 126 assembles with the first bow 120, the cover material 126 needs to be taut when the canopy assembly 108 is in a deployed state. In this regard, the shape of the first support bow 120 can be designed such that an initial distance D (i.e., when the first support bow 120 is not assembled as shown in FIG. 3) between the two opposite end portions 120A is different from (e.g., smaller than) the actual distance that separates the end portions 120A after the first support bow 120 is installed on the support frame 102. In other words, the two end portions 120A are displaced away from each other (which modifies the initial distance D) when the first support bow 120 is assembled with the coupling parts 134 on the support frame 102. In this manner, the cover material 126 can be pulled tight. Once the canopy assembly 108 is installed with the mount fixtures 124 on the support frame 102, the displacement or elastic deformation of the end portions 120A can create inward spring forces that are continuously applied by the end portions 120A to respectively urge the coupling parts 134 toward the coupling parts 132 (in particular, the caps 146 toward the sockets 138). As a result, the ribs 162 of each cap 146 can be respectively urged and held in the corresponding recesses 140A.

It will be readily appreciated that the positions of the socket 138 and the cap 146 can be changed (e.g., the socket 138 is placed at the inner side rather than the outer side of the handle 114 of the support frame 102). In this case, outward spring forces can be created by having the initial distance D greater than the actual distance that separates the end portions 120A when the first support bow 120 is installed with the mount fixtures 124 on the support frame 102. In this case, the end portions 120A are deformed toward each other when the first support bow 120 is attached with the coupling parts 134 on the support frame 102.

For adjusting the extension of the cover material 126, the first support bow 120 can be rotated forward or rearward. Owing to the elastic force applied by the first support bow 120 on each of the coupling parts 134, the ribs 162 can be guided to slide respectively along the slopes 140B and 140C of the teeth 140 to shift between different recesses 140A, which cause reciprocated displacements of each cap 146 relative to the associated coupling part 132 parallel to the pivot axis X1. In one embodiment, the ribs 162 can respectively slide along the slopes 140B toward the apexes of the teeth 140 when the first support bow 120 is rotated forward to stretch the cover material 126, and the ribs 162 can respectively slide along the slopes 140C toward the apexes of the teeth 140 when the first support bow 120 is rotated rearward to fold the cover material 126. Because the slopes 140C are steeper than the slopes 140B, more resistance is produced when the first support bow 120 is adjusted rearward toward a folded state, whereas the forward rotation of the first support bow 120 is facilitated. This makes easier the stretch of the cover material 126, but produces effective resistance against rearward folding of the cover material 126. As a result, the cover material 126 can be effectively held in the desired deployed state.

Once the first support bow 120 reaches a desired position, the ribs 162 can be retained in corresponding recesses 140A to hold the first support bow 120 in place.

Figure 11:
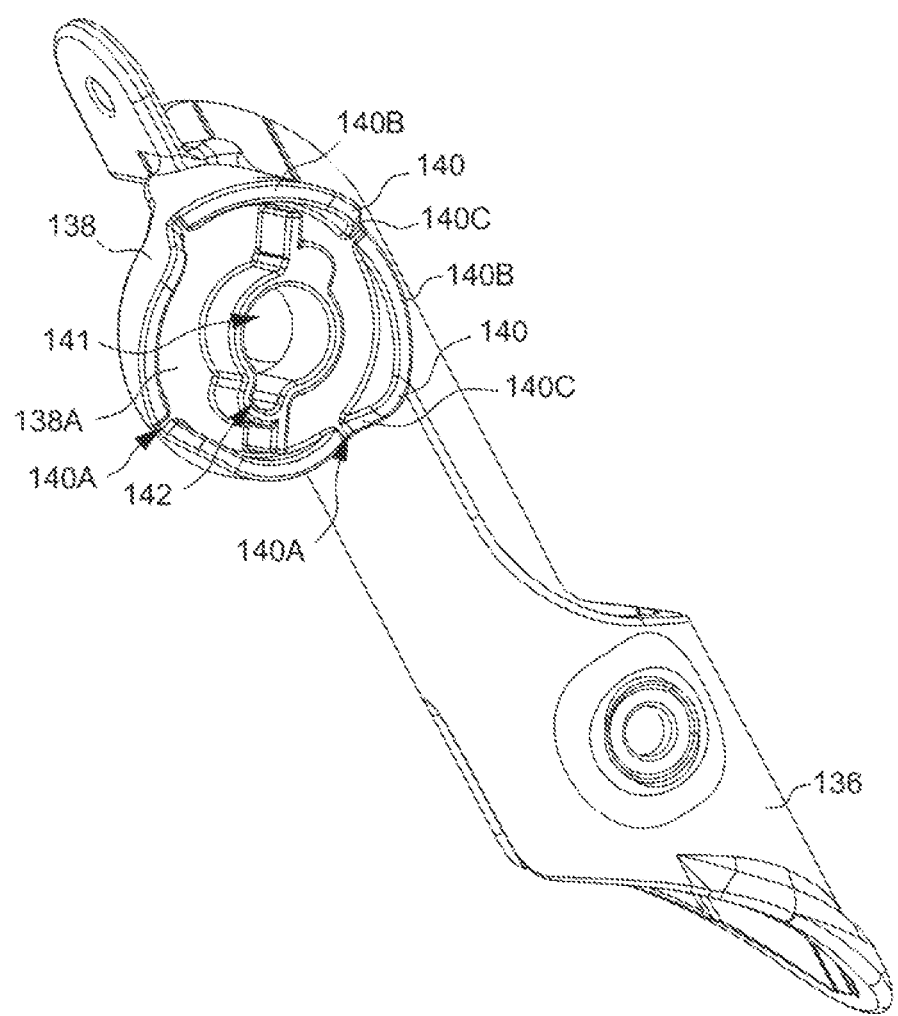
FIGS. 11 and 12 are schematic views illustrating coupling parts used in a variant embodiment of the mount fixture shown in FIG. 2.
Figure 12:
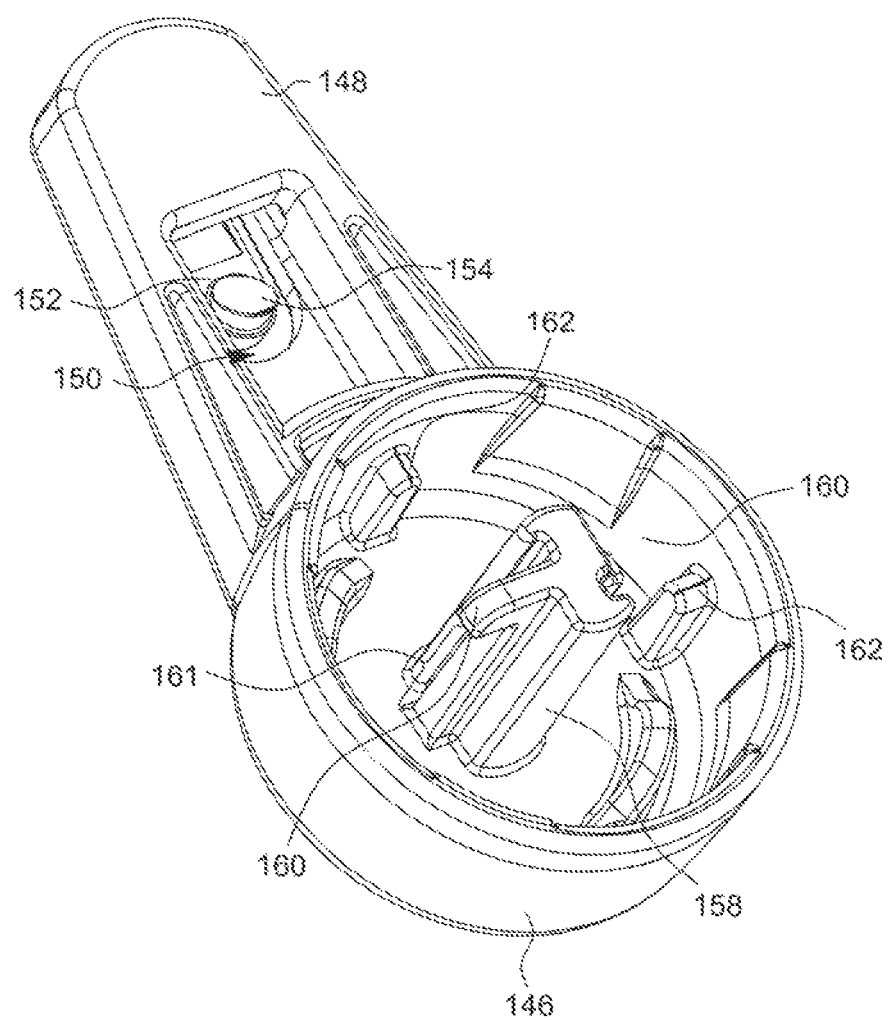

It can be appreciated that many variations of the mount fixture 124 will be readily apparent based on the embodiments described herein. In some variant embodiments, the structure of the socket 138 and the features of the cap 146 can be interchanged on the coupling parts 132 and 134. For example, the structure of the cap 146 (e.g., including the raised portion 158 and retainer extension 160) can be provided on the coupling part 132, whereas the structure of the socket 138 (e.g., including the teeth 140, recesses 140A, opening 141 and slits 142) can be provided on the coupling part 134. As shown in FIGS. 11 and 12, in alternate embodiments, one single retainer extension 160 may be provided, which can project radial from the raised portion 158 and can be offset from the base surface 146A such that a gap 161 is delimited between the retainer extension 160 and the base surface 146A. In this case, one single slit 142 may be provided in the socket 138 to match with the retainer extension 160.

Figure 13:
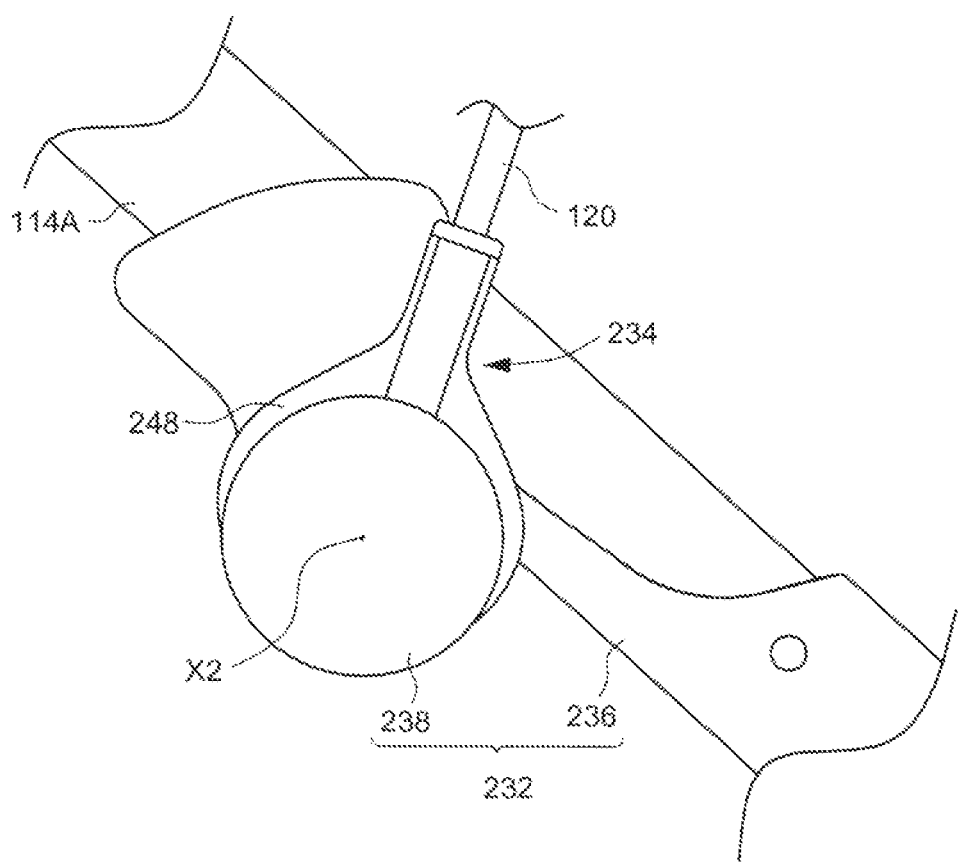
FIGS. 13-15 are schematic views illustrating another embodiment of a mount fixture used in a canopy assembly.
Figure 14:
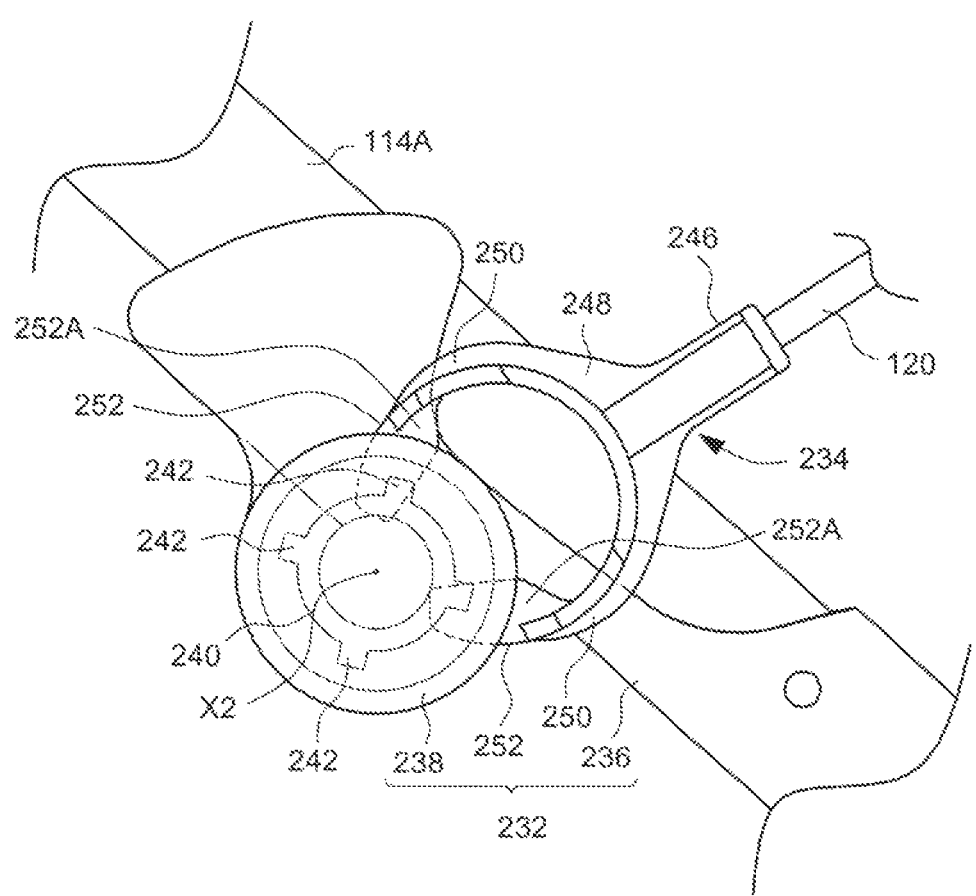
Figure 15:
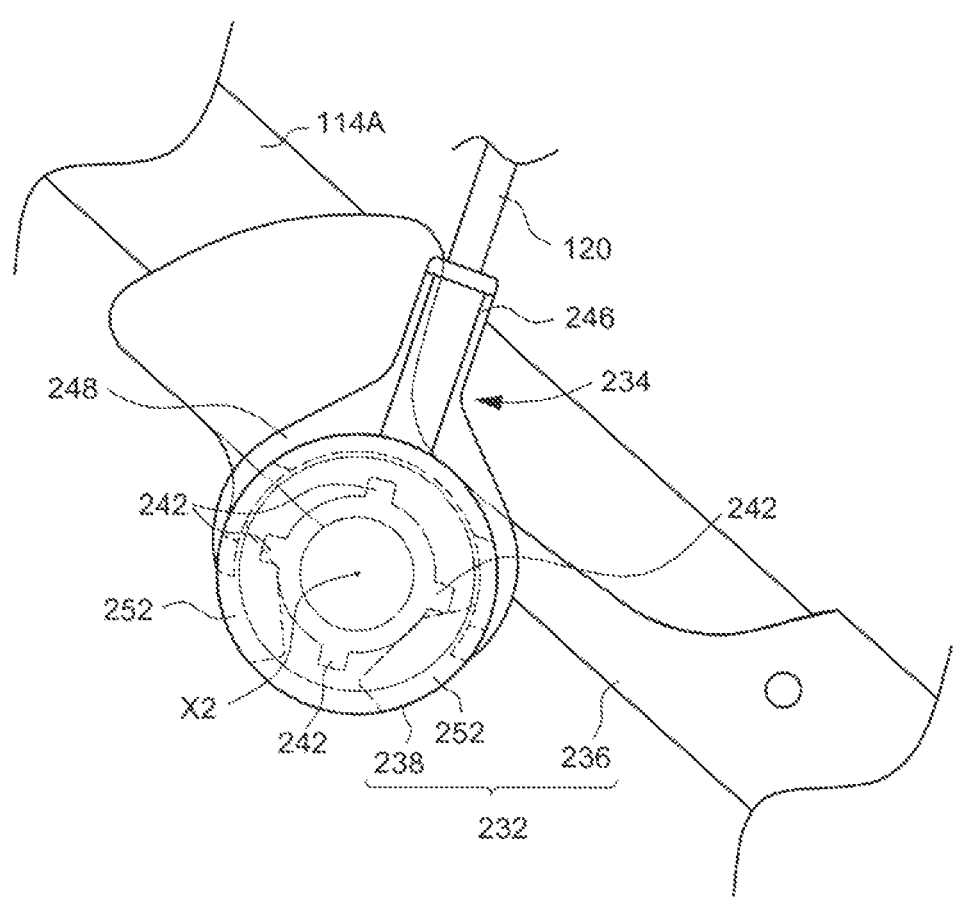

FIGS. 13-15 are schematic views illustrating another possible embodiment of a mount fixture 224 for a canopy assembly that only needs a small amount of component parts. The mount fixture 224 provided at each of the left and right ends of the support bow 120 can include two coupling parts 232 and 234 that are pivotally connected together. The coupling part 234 can be constructed to pivotally assemble the first support bow 120 with the coupling part 232.

In one embodiment, the coupling part 232 can include a sleeve portion 236 and a socket 238. The coupling part 232, including the sleeve portion 236 and the socket 238, can be formed as an integral body by plastic molding. The sleeve portion 236 can wrap at least partially around one side segment 114A of the handle 114 to affix the mount fixture 224 with the handle 114. A first side of the sleeve portion 236 can be provided with an attachment point (not shown) where an end of the second support bow 122 can be fixedly fastened.

Referring to FIG. 12, the socket 238 can be connected with the sleeve portion 236 at a position offset from a lengthwise axis of the sleeve portion 236, and extend in transversally relative to the sleeve portion 236. The socket 238 can include an anchor protrusion 240 (shown with dashed lines), and a plurality of teeth 242 (shown with dashed lines) that are disposed along an outer periphery of the anchor protrusion 240. In one embodiment, the anchor protrusion 240 can have a generally cylindrical shape, and the teeth 242 can project radially from the anchor protrusion 240.

The coupling part 234 can include a connecting portion 246 where the end portion 120A of the first support bow 120 is securely attached, and a clip 248 connected with the connecting portion 246. In one embodiment, the coupling part 234, including the connecting portion 246 and the clip 248, can be formed as an integral body by plastic molding.

The clip 248 can include one or more retainer extension 250 formed integrally with the coupling part 234. Each of the retainer extension 250 can elastically deflect so that the clip 248 can engage and grasp around the anchor protrusion 240, or disengage and release its hold on the anchor protrusion 240. An end portion of each retainer extension 250 can also form a flange 252 provided with a ramp surface 252A. The flange 252 of each retainer extension 250 can interfere with one tooth 242 to block rotation of the coupling part 232 relative to the coupling part 234, whereby the first support bow 120 can be held in position relative to the handle 114.

When the first support bow 120 is forced to rotate about a pivot axis X2 for adjustment, the teeth 242 can ride over the ramp surface 252A, which cause the retainer extension 250 to elastically deflect in a transversal direction (i.e., approximately parallel to the pivot axis X2) but still remain engaged with the anchor protrusion 240. As a result, the coupling parts 232 and 234 can be continuously held together during adjustment. The support bow 120 can rotate until it reaches a desired position, upon which the flange 252 of each retainer extension 250 can interfere with one tooth 242 to hold the support bow 120 in place.

At least one advantage of the structures described herein is the ability to secure a pivot connection between a support bow of the canopy assembly and the support frame with a reduced amount of component parts, e.g., no pivot axles/fastener rivets are required. As a result, the assembly of the adjustment mechanism for the canopy can be facilitated, and the manufacture cost reduced.

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. A canopy assembly comprising:
a support bow having a side end portion; and
a mount fixture including two coupling parts pivotally connected together about a pivot axis, one of the two coupling parts being adapted to securely affix with the side end portion, and the other one of the two coupling parts being configured to affix with a support frame of a child carrier apparatus, the support bow applying a force on one of the two coupling parts in a direction parallel to the pivot axis toward the support frame and the other one of the two coupling parts;
the two coupling parts including a first coupling part and a second coupling part, the first coupling part including a raised portion and a retainer extension connected with each other, and the second coupling part having a base surface provided with an opening and a slit communicating with each other, the raised portion being fixedly joined with the first coupling part and projecting along the pivot axis, the raised portion further being received within the opening to pivotally connect the first and second coupling parts, and the retainer extension being inserted through the slit into an inner cavity of the second coupling part and positioned to prevent separation of the first coupling part from the second coupling part while allowing relative rotation between the two coupling parts;
wherein during pivotal adjustment of the support bow, the first coupling part, the raised portion and the retainer extension rotate in unison relative to the second coupling part about the pivot axis and concurrently perform reciprocated displacements parallel to the pivot axis relative to the second coupling part.

2. The canopy assembly according to claim 1, wherein the retainer extension projects radially from the raised portion, and the slit extends radially from the opening.

3. The canopy assembly according to claim 1, wherein the second coupling part further includes a plurality of teeth protruding from the base surface around the opening, and a plurality of recesses defined between the teeth, and the first coupling part further includes one or more ribs spaced apart from the raised portion, the rib being positioned in one of the recesses to hold the support bow in a desired position.

4. The canopy assembly according to claim 3, wherein each of the teeth includes side slopes that respectively lower toward the recesses that are adjacent thereto, the rib sliding in contact with the side slopes and travelling successively through the recesses when the first coupling part rotates relative to the second coupling part.

5. The canopy assembly according to claim 4, wherein the teeth are distributed around the pivot axis, and a rotation of the first coupling part about the pivot axis relative to the second coupling part causes the first coupling part to concurrently perform a displacement along the pivot axis owing to a sliding contact of the rib with at least some of the side slopes.

6. The canopy assembly according to claim 1, wherein the support bow is made of a resilient material, the side end portion is formed integrally with the support bow, and the side end portion of the support bow applies a spring force parallel to the pivot axis that urges one of the two coupling parts toward the support frame and the other one of the two coupling parts.

7. The canopy assembly according to claim 6, wherein the spring force applied by the side end portion of the support bow is induced by an elastic deformation of the support bow occurring when the support bow is assembled with the mount fixture on the child carrier apparatus.

8. The canopy assembly according to claim 1, wherein the support bow has a U-shape.

9. The canopy assembly according to claim 1, further comprising a second support bow having a second end portion securely affixed with one of the two coupling parts at a position spaced apart from the support bow.

10. The canopy assembly according to claim 9, wherein the second support bow is located behind the support bow.

11. A method of assembling a canopy on a child carrier apparatus, comprising:
providing a mount fixture including two coupling parts, a first one of the two coupling parts being adapted to securely affix with a side end portion of a canopy support bow and having a cap, and a second one of the two coupling parts being configured to affix with a support frame of the child carrier apparatus and having a socket, the first coupling part including a raised portion fixedly connected with an inner surface of the cap and a retainer extension connected with the raised portion, and the second coupling part having a base surface provided with an opening and a slit, the slit and the opening communicating with an inner cavity of the second coupling part;
pivotally assembling the two coupling parts about a pivot axis by positioning the first coupling part such that the raised portion and the retainer extension are respectively inserted through the opening and the slit, the cap covering the socket and the pivot axis intersecting the cap;
rotating the first coupling part, the raised portion and the retainer extension in unison relative to the second coupling part until the retainer extension is misaligned relative to the slit and is engaged in the inner cavity, whereby the two coupling parts are held together while allowing relative rotation between the two coupling parts; and
attaching the side end portion of the support bow with the associated coupling part, such that when the two coupling parts and the support bow are installed on the support frame, the support bow applies a force on the coupling part affixed with the support bow in a first direction parallel to the pivot axis that biases the cap toward the socket of the other coupling part affixed with the support frame, and the engagement of the retainer extension in the inner cavity prevent the two coupling parts from separating from each other in a second direction parallel to the pivot axis that is opposite to the first direction.

12. A child carrier apparatus comprising:
a support frame;
a canopy assembly including:
a support bow having two end portions integrally formed with the support bow;
a cover material held with the support bow; and
two mount fixtures for assembling the two end portions with the support frame, each of the mount fixtures including first and second coupling parts that are held together and are movably adjustable relative to each other, the first coupling part being affixed with one end portion of the support bow, the second coupling part being affixed with the support frame, wherein in at least one of the two mount fixtures, one of the first and second coupling parts is formed with a raised portion that defines a pivot axis, the other one of the first and second coupling parts has an opening and a border region adjacent to the opening, the raised portion being received through the opening to pivotally connect the first and second coupling parts about the pivot axis, the raised portion being further fixedly connected with a retainer extension that extends radially relative to the pivot axis, the retainer extension being engageable with the border region adjacent to the opening to prevent separation of the first coupling part from the second coupling part;
wherein each of the two end portions of the support bow applies a spring force in a direction parallel to the pivot axis that urges the first coupling part toward the support frame and the second coupling part of the associated mount fixture.

13. The child carrier apparatus according to claim 12, wherein the support bow has a U-shape and is made of a resilient material.

14. The child carrier apparatus according to claim 12, wherein the two end portions are separated by an initial distance, and the support bow when assembled with the first coupling parts on the child carrier apparatus is deformed so as to modify the initial distance between the two end portions.

15. The child carrier apparatus according to claim 12, wherein in at least one of the two mount fixtures, one of the first and second coupling part includes an inner surface from which a plurality of teeth protrude around the pivot axis, and a plurality of recesses defined between the teeth, and the other one of the first and second coupling part includes a rib eccentric from the pivot axis, the rib being positioned in one of the recesses to hold the support bow in a desired position.

16. The child carrier apparatus according to claim 15, wherein each of the teeth includes side slopes that respectively lower toward the recesses, a rotation of the first coupling part about the pivot axis relative to the second coupling part causes the first coupling part to concurrently perform a displacement along the pivot axis owing to a sliding contact of the rib with at least some of the side slopes.

17. The canopy assembly according to claim 1, wherein an engagement of the retainer extension in the inner cavity prevents the two coupling parts from separating from each other in a second direction parallel to the pivot axis that is opposite to the direction of the force applied by the support bow.

18. The canopy assembly according to claim 1, wherein the first coupling part is affixed with the support bow and has a cap, and the second coupling part is affixed with a support frame of a child carrier apparatus and has a socket that is covered by the cap, the pivot axis intersecting the cap, and the force applied by the support bow biasing the cap toward the socket.

19. The canopy assembly according to claim 1, wherein the raised portion and the retainer extension are formed integrally with the first coupling part.

* * * * *